(12) United States Patent
Kerschberg et al.

(10) Patent No.: US 7,117,207 B1
(45) Date of Patent: Oct. 3, 2006

(54) PERSONALIZABLE SEMANTIC TAXONOMY-BASED SEARCH AGENT

(75) Inventors: Larry Kerschberg, Fairfax, VA (US); Wooju Kim, Seoul (KR); Anthony Scime, Brockport, NY (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 571 days.

(21) Appl. No.: 10/660,103

(22) Filed: Sep. 11, 2003

Related U.S. Application Data

(60) Provisional application No. 60/409,575, filed on Sep. 11, 2002.

(51) Int. Cl.
G06F 7/00 (2006.01)
G06F 17/30 (2006.01)

(52) U.S. Cl. .................. 707/5; 707/1; 707/3; 707/4; 709/217

(58) Field of Classification Search .............. 707/1, 707/3, 4, 5; 709/217
See application file for complete search history.

(56) References Cited

U.S. PATENT DOCUMENTS

2002/0069190 A1* 6/2002 Geiselhart .............. 707/1
2003/0055819 A1* 3/2003 Saito et al. ............. 707/3
2003/0212673 A1* 11/2003 Kadayam et al. ......... 707/3
2004/0064526 A1* 4/2004 Lee et al. ............... 709/217

OTHER PUBLICATIONS

Pahlevi et al., "Taxonomy Based adaptive Web Search Method", Proceedings of the International Conference on Information Technology: Coding and Computing, 2002; pp. 320-325; Aug. 10, 2002.*

* cited by examiner

Primary Examiner—Apu Mofiz
Assistant Examiner—Michael J. Hicks
(74) Attorney, Agent, or Firm—David G. Grossman; David Yee

(57) ABSTRACT

Disclosed is a search mechanism comprising: accepting search intent information from a user having a search intent; creating a semantic taxonomy tree having term(s) representative of the search intent information; augmenting the term(s) with associated concepts derived from the term(s) using existing terminological data; associating a weight with at least one of the term(s); obtaining user preference intent; determining root term(s); transforming the semantic taxonomy tree to a Boolean search query; submitting the Boolean search query to searcher(s); receiving at least one search result(s); interpreting the search result(s); requesting page(s) specified the search result(s); receiving the page(s); generating ranked results; presenting the ranked results to the user; presenting the semantic taxonomy tree to the user; accepting user feedback from the user; and using the user feedback to update the user preference intent.

38 Claims, 17 Drawing Sheets

User Profile Learning Algorithm inputs: *MAX_EPOCHS, MIN_ERROR, UserProfileModel, DocumentSet, UserFeedBack, NWS*
    local variables: *epochs, currentError, documentError, node, weight, document, nwse, parameter, documentVector, relevancyLevel* loop do
    if *currentError* < *MIN_ERROR* then return success
    else if *epochs* > *MAX_EPOCHS* then return success
    *currentError* ← 0.0
    for each *document* in *DocumentSet* do
        compute *documentVector*
        for each *node* in the leaf node set of *UserProfileModel* do
            bind *node* with the corresponding value of *documentVector*
        end
        propagate *UserProfileMode*
            using General Propagation Rule and Theta Propagation Rule
        obtain *relevancyLevel* at the root node of *UserProfileModel*
        compute *documentError* using Relevancy Error Computing Rule
        for each *node* in the node set of *UserProfileModel* do
            if *node* is not related to $\theta$ then
                apply Generalized Delta Computing Rule to *node*
            else
                apply Delta for Theta Computing Rule to *node*
        end
        for each *weight* in the weight set of *UserProfileModel* do
            if *PS(weight)* is not equal to $\theta$ then
                apply Generalized Weight Updating Rule to *weight*
            else
                apply Theta Updating Rule to *weight*
        end
        for each set of weights *nwse* in *NWS* do
            for each *weight* in *nwse* do
                apply Weight Normalization Rule to *weight*
            end
        end
        for each *parameter* in the parameter set of *UserProfileModel* do
            for each *weight* in *PSWS(parameter)* do
                apply Weight Synchronization Rule to *weight*
                if *weight* < 0 then *weight* ← 0
                else if *weight* > 1 then *weight* ← 1
            end
        end
        *currentError* ← *currentError* + *documentError*
    end
    *epochs* ← *epochs* + 1
end

FIG. 8

| Search Engines | Average Performance |
|---|---|
| WebSifter | 63% |
| Copernic | 40% |
| Altavista | 43% |
| Google | 40% |
| Yahoo | 48% |
| Excite | 43% |

FIG. 14

| Rank | URL | Feedback | Relevancy |
|---|---|---|---|
| 1 | http://www.countryseat.com | Y | Y |
| 2 | http://www.infant-car-seat.com/ | N | N |
| 3 | http://www.chairmaker.co.uk/ | Y | Y |
| 4 | http://www.convertible-car-seat.com/ | N | N |
| 5 | http://www.booster-car-seats.com/ | N | N |
| 6 | http://www.booster-seats-online.com/ | Don't Know | N |
| 7 | http://www.booster-car-seat.com/ | Don't Know | N |
| 8 | http://www.podiatrychair.com/ | Don't Know | N |
| 9 | http://www.carolinachair.com/ | Don't Know | Y |
| 10 | http://www.chairdancing.com/ | Don't Know | N |
| 11 | http://www.massage-chairs-online.com/ | Don't Know | N |
| 12 | http://www.panasonic-massage- | Don't Know | N |
| 13 | http://www.fairfieldchair.com/ | Don't Know | Y |
| 14 | http://www.gasserchair.com/ | Don't Know | Y |
| 15 | http://www.chairtech.com/ | Don't Know | Y |
| 16 | http://www.snugseat.com/ | Don't Know | N |
| 17 | http://www.seat.com/ | Don't Know | N |
| 18 | http://www.fifthchair.org/ | Don't Know | N |
| 19 | http://www.painted- | Don't Know | N |
| 20 | http://www.jeanmonnetprogram.org/ | Don't Know | N |

FIG. 15

| Rank | URL | Relevancy |
|---|---|---|
| 1 | http://www.fairfieldchair.com/ | Y |
| 2 | http://www.chairmaker.co.uk/ | Y |
| 3 | http://www.carolinachair.com/ | Y |
| 4 | http://www.podiatrychair.com/ | N |
| 5 | http://www.chairdancing.com/ | N |
| 6 | http://www.gasserchair.com/ | Y |
| 7 | http://www.chairtech.com/ | Y |
| 8 | http://www.snugseat.com/ | N |
| 9 | http://www.fifthchair.org/ | N |
| 10 | http://www.ompchairs.com/ | Y |
| 11 | http://www.cyberchair.com/ | Y |
| 12 | http://www.massage-chairs-online.com/ | N |
| 13 | http://www.panasonic-massage- | N |
| 14 | http://www.jeanmonnetprogram.org/ | N |
| 15 | http://www.leap-chair.com/ | Y |
| 16 | http://www.painted- | N |
| 17 | http://www.zackback.com/ | Y |
| 18 | http://www.chair-ergonomics.com/ | Y |
| 19 | http://www.countryseat.com | Y |
| 20 | http://www.infant-car-seat.com/ | N |

FIG. 16

| Search Term | Before Learning | After Learning | Performance Enhancement |
|---|---|---|---|
| chair | 30% | 55% | 25% |
| paper | 45% | 60% | 15% |
| pen | 55% | 85% | 30% |
| rock | 15% | 75% | 60% |
| phone | 65% | 80% | 15% |
| Average | 42% | 71% | 29% |

FIG. 17

PERSONALIZABLE SEMANTIC TAXONOMY-BASED SEARCH AGENT

CROSS-REFERENCE TO RELATED APPLICATIONS

The present application claims the benefit of provisional patent application Ser. No. 60/409,575 to Kim, filed on Sep. 11, 2002, entitled "Learning for Automatic Personalization in a Semantic Taxonomy-Based Meta-Search Agent," which is hereby incorporated by reference.

BACKGROUND OF THE INVENTION

The present invention relates to the field of information searching. Specifically, the present invention relates to efficient searching of information of networks such as the World Wide Web.

With the advent of the Internet and the Web, the amount of information available grows daily. However, having too much information at one's fingertips does not always mean high quality information, in fact, it may often prevent a decision maker from making sound decisions, by degrading the quality of the decision. Helping decision makers to locate relevant information in an efficient manner is very important both to the person and to an organization in terms of time, cost, data quality and risk management.

Although search engines assist users in finding information, many of the results are irrelevant to the decision problem. This is due in part, to the keyword search approach, which does not capture the user's intent, what we call meta-knowledge. Another reason for irrelevant results from search engines is a "semantic gap" between the meanings of terms used by the user and those recognized by the search engines. In addition, each search engine has its own proprietary and uncustomizable ranking system, where users may not specify search and ranking preferences to a search engine. For example, a shopping agent may go for the lowest price, while the user might want the "most flexible return policy." Finally, most search engines lack learning capabilities to adapt and personalize user preferences. They may not track large numbers of users. What is needed is a personal agent approach that may help to solve these problems.

BRIEF SUMMARY OF THE INVENTION

One advantage of the present invention is that it may provide a search mechanism that has a richer search intent and preference representation scheme.

Another advantage of this invention is that it may provide a framework that secures an automatic personalization method.

A further advantage of this invention is that it may improve information retrieval performance over previous information retrieval user profile learning methods.

A further advantage of this invention is that it improves information retrieval performance over previous information retrieval user profile learning methods.

Another advantage of the present invention is that it uses a tree structure that makes it possible to represent many concepts at the same time. This advantage allows the user to specify a broad range of interests simultaneously.

To achieve the foregoing and other advantages, in accordance with all of the invention as embodied and broadly described herein, is a a search method comprising: accepting search intent information from a user having a search intent; creating a semantic taxonomy tree having at least one term representative of the search intent information; augmenting the at least one term with at least one associated concept derived from at least one of the at least one term using existing terminological data; associating a weight with at least one of the at least one term; obtaining user preference intent for at least one relevance value; determining at least one root term for the at least one term; transforming the semantic taxonomy tree to at least one Boolean search query; submitting at least one of the at least one Boolean search query to at least one searcher; receiving at least one search result from the at least one searcher; interpreting the at least one search result; requesting at least one page specified by the at least one search result; receiving at least one retrieved page; generating ranked results by ranking the at least one retrieved page by applying at least one of the at least one relevance value and the search intent information to the at least one retrieved page; presenting the ranked results to the user; presenting the semantic taxonomy tree to the user; accepting user feedback from the user; the user feedback indicating how well the search results addressed the search intent; and using the user feedback to update the user preference intent for the at least one relevance value.

In yet a further aspect of the invention, A machine readable medium having stored thereon instructions that, when executed by a computer: accepts search intent information from a user having a search intent; creates a semantic taxonomy tree having at least one term representative of the search intent information; augments the at least one term with at least one associated concept derived from the search intent information using existing terminological data; associates a weight with at least one of the at least one term; obtains user preference intent for at least one relevance value; determines at least one root term for the at least one term; transforms the semantic taxonomy tree to at least one Boolean search query; submits at least one of the at least one Boolean search query to at least one searcher; receives at least one search result from the at least one searcher; interprets the at least one search result; requests at least one page specified by the at least one search result; receives at least one retrieved page; generates ranked results by ranking the at least one retrieved page by applying at least one of the at least one relevance value and the search intent information to the at least one retrieved page; presents the ranked results to the user; presents the semantic taxonomy tree to the user; accepts user feedback from the user; the user feedback indicating how well the search results addressed the search intent; and uses the user feedback to update the user preference intent for the at least one relevance value.

In yet a further aspect of the invention, a A search agent comprising: a weighted semantic taxonomy tree elicitor capable of accepting search intent information from a user having a search intent; a weighted semantic taxonomy tree capable of storing at least one term representative of the search intent information; an ontology agent capable of deriving concepts from the at least one term using terminological data; a search preference elicitor capable of receiving user preference intent for at least one relevance value; at least one search preference elicitor database capable of storing the user preference intent; a stemming agent capable of determining a root term from the search preference elicitor database; a search broker including: a transformer capable of transforming the weighted semantic taxonomy tree to at least one boolean search query; a search submitter capable of submitting at least one of the at least one boolean search query to at least one search engine; and a search engine result receiver capable of receiving at least one search engine result from the boolean search query submission; a page request broker capable of retrieving at least one retrieved page specified by the search engine result; a web page rater capable of generating ranked results by ranking the at least one retrieved page by applying the relevance values and the search intent information to the at least one retrieved page; and a presentation manager capable of presenting the weighted semantic taxonomy tree and the ranked results to the user; a user profile learning agent capable of: accepting user feedback from the user; the user feedback indicating how well the search results addressed the search intent; and using the user feedback to update at least one of the user preference intent in the at least one search preference elicitor database.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 8 shows a user profile learning algorithm as per an embodiment of the present invention.

FIG. 14 shows a table where the overall performance of several search engines are compared.

FIG. 15 shows initial retrieved page hit results and user's feedback as per an aspect of an embodiment of the present invention.

FIG. 16 shows page hit results after instant learning and its relevancies as per an aspect of an embodiment of the present invention.

FIG. 17 shows page hit ratios from five learning experiments as per an aspect of an embodiment of the present invention.

DETAILED DESCRIPTION OF THE INVENTION

Figure 1:
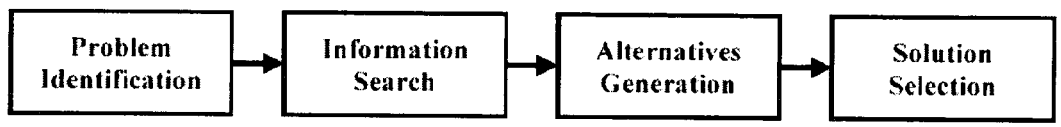
FIG. 1 is a block diagram showing four phases of a decision making process.

The present invention is a semantic taxonomy-based personalizable meta-search agent which uses a tree-structured representation scheme with which users may specify their search intent. This representation scheme may be called a "Weighted Semantic Taxonomy Tree (WSTT)," in which each node denotes a concept that pertains to the user's problem-domain. This invention allows a user preference representation scheme based on various components, each of which represents a specific decision-criterion. Such representation scheme permits users to express their preference for a search.

To rate the relevance of a page hit, the present invention uses a rating mechanism by combining the WSTT and the component-based preference representation. Since Web page rating may itself be viewed as a decision-making problem, where a decision maker (a user) must evaluate various alternatives (Web pages) for his/her problem (user's Web search intention), the design of the rating mechanism incorporates decision-analytic methods.

The search performance of the WSTT and preference components based meta-search agent approach has been validated empirically against well-known search engines. As an improvement, the present invention is a learning mechanism for the adaptive personalization of both the user's search intent as well as the user's ranking preferences.

Most of the typical search engines and research tools use a term-frequency vector as part of the user profile to learn the user's behavior (preferences and search intent), while the present invention provides a richer search intent and preference representation scheme. Moreover, by using this invention's search intent and preference representation scheme as a basis of user profile representation and providing a user profile learning mechanism based on that representation model, the framework secures an automatic personalization method. In addition, this invention improves information retrieval performance over previous information retrieval user profile learning methods. Such improvements may be achieved by using a connectionist model-based user profile representation scheme, which may leverage all features of the semantic taxonomy-based personalizable meta-search agent approach and its learning mechanism that is extended and modified from the well-known neural network learning rule, the generalized delta rule. Finally, the present invention incorporates a learning scheme as a component system in a meta-search agent called WebSifter II.

Most current Internet search engines such as Yahoo!, Excite, AltaVista, WebCrawler, Lycos and Google suffer from Recall and Precision problems. The relatively low coverage of individual search engines leads to using meta-search engines to improve the recall of a query. Examples include MetaCrawler, SavvySearch, NECI Metasearch Engine and Copernic. This meta-search engine approach partly addresses the recall problem but still suffers from the precision problem, which may be categorized into three major themes: content-based, collaborative, and domain-knowledge approaches.

The content-based approach first represents a user's explicit preferences and then evaluates Web page relevance in terms of its content and user preferences. Syskill &

Webert, WebWatcher, WAWA and WebSail fall into this category. Further, some researches take into account not only Web page content but also structure (e.g., hyperlinks) to evaluate relevance.

The collaborative approach determines information relevancy based on similarity among users rather than similarity of the information itself. Example systems include Firefly and Ringo, Phoaks and Siteseer. In addition, some hybrid approaches, such as Fab, Lifestyle Finder and Web-Cobra, incorporate both approaches.

The domain knowledge approach uses user and organizational domain knowledge to improve the relevancy of search results. Yahoo! uses domain knowledge and provides a pre-defined taxonomy path. So, classifying Web pages automatically into a pre-defined or dynamically created taxonomy is a related issue to this approach. NorthernLight (www.northernlight.com) is a search engine that supports this kind of dynamic taxonomy service.

Some research incorporates user domain knowledge in a more explicit way. For example, Aridor et al. represents user domain knowledge as a small set of example Web pages provided by users, whereas Chakrabarti et al. adopts both a pre-defined (but modifiable) taxonomy and a set of example user-provided Web pages as domain knowledge.

Problematically, most approaches force users to use a search engine in a passive rather than active manner. Often, the user may not understand why extraneous and irrelevant results are retrieved. There is a pressing need for users to be able to express their query intent in a more natural and structured manner. Also, current approaches lack sufficient expressive power to capture a user's search intent and preferences because most of the representation schemes are based on a vector space model or its variants. In addition, most approaches do not take full advantage of domain-specific knowledge to scope the search, filter the hits and classify the query result.

Several approaches mentioned incorporate a learning component to enhance search precision by tracking and capturing user feedback or behavior. Generally, their learning features may be further classified in terms of three aspects: 1) the user profile representation scheme for learning, 2) the user feedback mechanism and 3) the learning algorithm used.

The present invention focuses on the first aspect, the representation of the user profile, because its impact on the personalization performance is large. So far, the most popular user profile representation scheme is the word frequency vector, which originated from the vector space model. Skill & Webert, WebWatcher, WebSail, Siteseer, Fab, Amalthaea, Alipes and SIFT are example systems that use the word frequency vector as their basis for user profile representation.

However, learning a user profile based on the word frequency vector may result in many biased page hits when using it for searching and rating. To overcome this limitation in using the vector space model, many researchers try to extend the vector space model or incorporate other ways to represent the user profile. For example, ifWeb and SitelF use semantic networks. PSUN uses a kind of associative network of words. SmartPush and OBIWAN use an ontology in the form of a hierarchical concept tree.

Even though these approaches improve user profile representation, their user profile representation schemes are still based on word frequencies and word ordering, and thus, causes two kinds of limitations. First, there are many important aspects in user profile for Web search, which may not be easily represented by using only the word frequency concept. By incorporating collaborative filtering through the learning of other users, improvements may be made in the value of the results. User's preference for authority and popularity of page hit may provide for this collaborative learning. Second, even when using domain knowledge, such as an ontology, the domain knowledge is fixed and not user-generated. The ontology's perspective of the domain drives the user toward a specific result. When others construct the ontology, it tends to achieve the ontology's preferred result. Whereas, if the ontology is user made, it should arrive at, or come closer to, the user's goal.

To maximize personalization, the present invention extracts domain knowledge from users and uses the domain knowledge to represent a part of the user profile.

A description of the semantic taxonomy-tree-based approach for personalized Information retrieval as per the present invention will now be discussed. Usually a keyword-based search representation is insufficient to express a user's search intent. By postulating a user's decision-making process as depicted in FIG. 1, the present invention may readily support query formulation and search.

This process starts with a problem identification phase; then a user seeks relevant information to solve the identified problem. Subsequent steps include collecting information, listing alternatives, evaluating them and selecting a solution. One implication of the decision-making process is that the better one understands a user's problem, the better one may support a user's information search. The present invention represents a user's search intent through a hierarchical concept tree with weights associated with each concept, thereby reflecting user-perceived relevance of concepts to the search.

Figure 2:
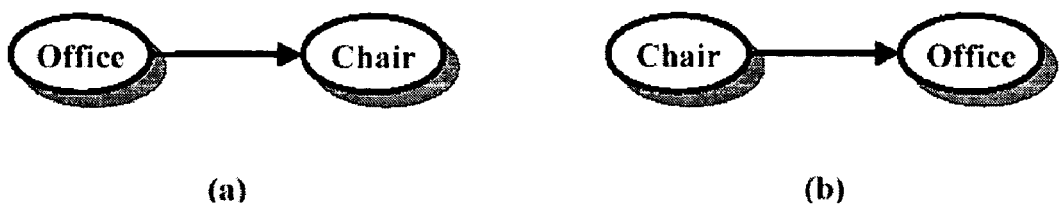
FIG. 2 is a block diagram showing a simple example of a taxonomy tree.

For instance, assume that a person has started a new business and is looking for office equipment. He wants to search for information about office equipment on the Web. Supposing he wants information about chairs, he might build a query with the term "chair." If he were a more skilled user of Internet search engines, he might build a query using two terms, like "office" and "chair," to obtain more precise results. He may also use the 'AND' or 'OR' operator between them. In this case, the term "office" provides added context for the search. However, this formulation is still very implicit and passive. One way to express this kind of context information is by using a taxonomy tree as shown in FIG. 2. FIG. 2, item a illustrates a simple taxonomy tree that represents a search intention to find a chair in the context of office, while a search for finding an office in the context of chair is expressed by item b in FIG. 2. The taxonomy tree provides more expressive semantics than simple keyword-based representations used by most current search engines.

The taxonomy tree approach is already used to classify pages in search engines such as Yahoo! and Google. The present invention improves on this taxonomy tree approach by using a tree-based search representation model, called the Weighted Semantic Taxonomy Tree (WSTT) model, which allows users to present their search intention by defining their own taxonomy topology.

The method to build such a tree is very similar to the approach in a conventional AHP approach, which has been shown to be a convenient way for a general user to describe his decision criteria in Decision Science. To build a WSTT model, a user defines a broad concept term that includes the term he seeks. Then he continues to refine that concept, specializing it by adding child nodes with more specific concept terms. At the same time he is assigning the relative importance levels to each concept term between sibling nodes. Through this procedure, users may build their own hierarchical taxonomy tree, and assign importance levels to each term within the context of their antecedent terms.

In the context of organizational ontologies, organizations may specify focused ontologies that may be used by users to formulate search requests. They may also extend the organizational terms by specializing the terms as discussed above.

Figure 3:
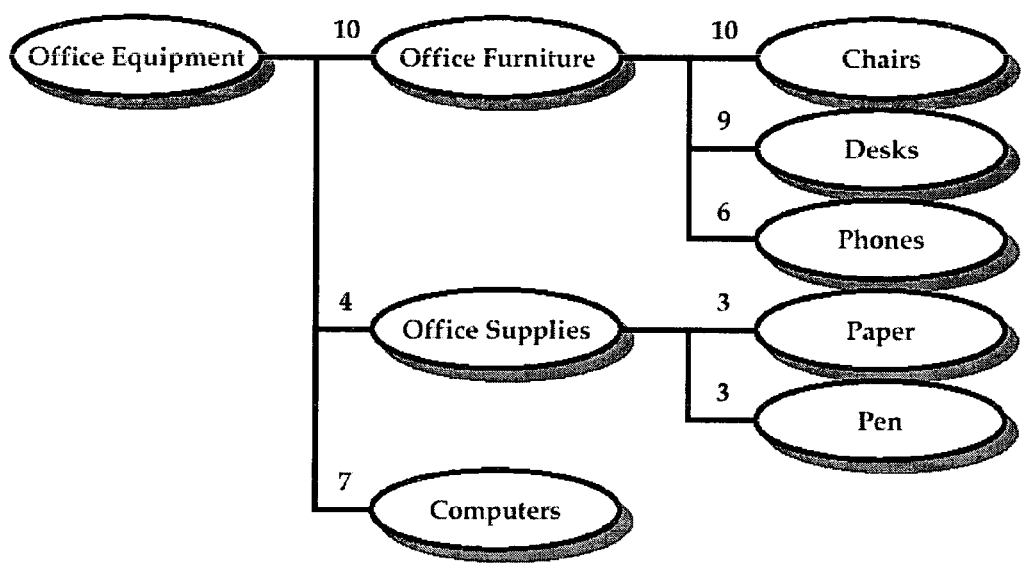
FIG. 3 is a block diagram showing an example of a WSTT representing a businessman's search intent.

FIG. 3 shows a realistic example of the businessman's search intention using our WSTT scheme. The upper subtree may be translated as that a businessman wants to find information about chairs, desks, and phones within the context of office furniture and office equipment where the numbers that appear to the left to each term, 10, 9, and 6 denote his respective importance levels assigned for chairs, desks, and phones.

However, one drawback may be that the terms may have multiple meanings, and this is one of the major reasons that search engines return irrelevant search results. To address this issue, the present invention builds into the WSTT scheme the notion of "word senses" from WordNet to allow users to refine their search intention.

WordNet is a linguistic database that uses sets of terms that have similar semantics (synsets) to represent word senses. Each synset corresponds to terms with synonymous meaning in English; each word may be associated with multiple synsets. Here, the term "synset" is renamed as "Concept."

The user may choose one of the concepts available from WordNet for the term of a specific node in WSTT. For example, the term "chair" has the following Four possible concepts from WordNet:

(1) {chair, seat}//a seat for one person, with a support for the back,
(2) {professorship, chair}//the position of professor, or a chaired professorship,
(3) {president, chairman, chairwoman, chair, chairperson} // the officer who presides at the meetings of an organization, and
(4) {electric chair, chair, death chair, hot seat} // an instrument of death by electrocution that resembles a chair.

If the user wants to search for a chair to sit on, he would choose the first concept. If the user selects the first concept, then without loss of generality, one may assume that the remaining concepts are not of interest, thereby obtaining both positive and negative indicators of his intent.

Now consider distinguishing the set of terms of the selected concept from the set of terms of the unselected concepts as Positive Concept Terms and Negative Concept Terms, and denoting them as pct(n) and nct(n) for a node n, respectively. If a user selects the first concept from "chair" example above, according to the definitions, pct(n) and nct(n) are as follows: pct(n)={chair, seat} and nct(n)={professorship, president, chairman, chairwoman, chairperson, electric chair, death chair, hot seat}.

Figure 4:
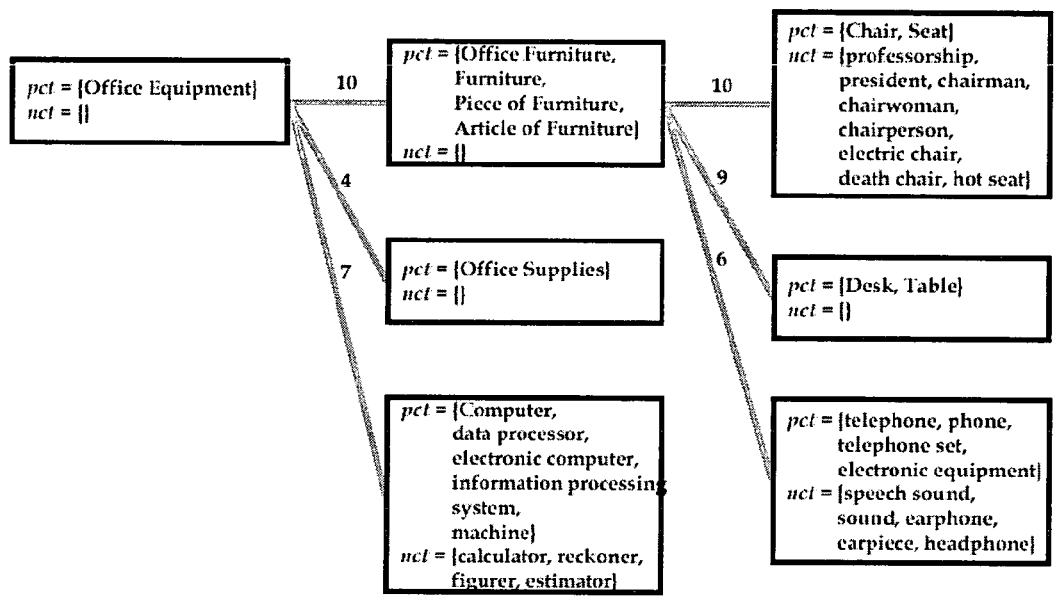
FIG. 4 is a block diagram showing an example of internal representation of a user's search intention.

For the office equipment example, FIG. 4 shows an internal representation of the user's intention via the WSTT schema, after the concept selection process has finished; the user however sees the tree of FIG. 3.

Another advantage of using the tree structure is that it is possible to represent many concepts at the same time. This advantage allows the user to specify a broad range of interests simultaneously.

The ranking of Web search hits by users involves the evaluation of multiple attributes, which reflect user preferences and their conception of the decision problem. By posing the ranking problem as a multi-attribute decision problem, the present invention examines the search results provided by multiple search engines, and ranks the pages according to multiple decision criteria. Multi-Attribute Utility Technology (MAUT) and Repertory Grid are two major approaches that address the information evaluation problem. The ranking approach combines MAUT and the Repertory Grid. Six search evaluation components may be defined as follows:

(1) Semantic component: represents a Web page's relevance with respect to its content.
(2) Syntactic component: represents the syntactic relevance with respect to its URL. This considers URL structure, the location of the document, the type of information provider, and the page type (e.g., home, directory, and content).
(3) Categorical Match component: represents the similarity measure between the structure of the user-created taxonomy and the category information provided by search engines for the retrieved Web pages.
(4) Search Engine component: represents the user's biases toward and confidence in search engine's results.
(5) Authority/Hub component: represents the level of user preference for Authority or Hub sites and pages. Authority sites usually have larger in-degree from Hub sites and Hub sites usually have larger out-degree to Authority sites [38]. This component is not yet implemented.
(6) Popularity component: represents the user's preference for popular sites. The number of visitors or the number of requests for the specific page or site may measure popularity.

Figure 5:
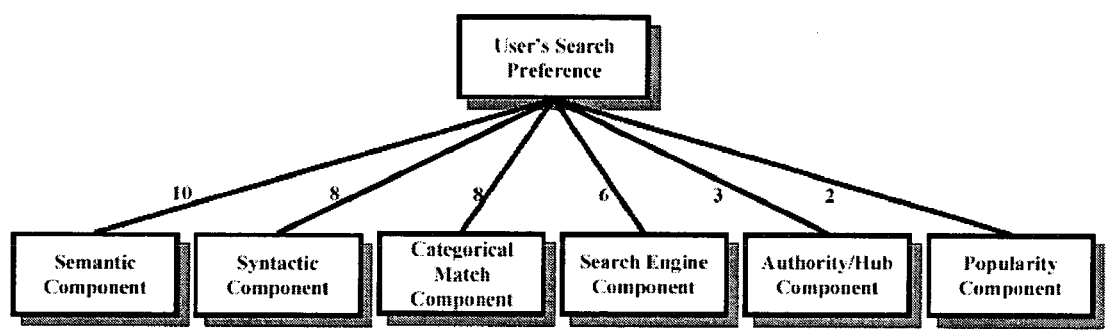
FIG. 5 is a block diagram showing a conceptual model of a user's preference representation scheme.

Further, in this multi-component-based preference representation scheme, the user may assign a preference level to each of these components, as well as each available search engine within the search engine component. Then, these components and the assigned preference level are eventually synthesized into a single unified value resulting in the relevance measure for a specific Web page. FIG. 5 conceptually depicts this scheme, whereby each number assigned to an edge denotes the user's preference level for that component. This multi-component preference scheme allows users more control over their searches and the determination of a page's relevance.

Since the present invention adopts a meta-search approach to Web information gathering to preserve the benefits of meta-search engines, the present invention neither creates nor maintains an index database of Web information. At present, search engines generally do not accept a search request based on the WSTT. To resolve this problem, the present invention incorporates a translation mechanism from the internal WSTT-based query, to Boolean queries that most of current search engines may process.

As already mentioned, a user's search intention as a tree is shown in FIG. 4. The leaf nodes denote the terms of interest to the user, and the antecedent nodes for each node form a search context. The entire tree may be transformed into a set of separate queries where each is acceptable to existing search engines. As a way to do this, first decompose the tree into a set of paths from the root to each leaf node. Then for each path, generate all possible combinations of terms, by selecting one term from the positive concept terms of each node in the path from a root node to a leaf node. Finally, obtain the resulting page hits from the search engines by posing each query to them.

Each resulting page hit from the target search engines for the generated query statements is generally evaluated for each search evaluation component. Six relevance values of each Web page are generally computed first, and then a composite value of these six relevance values may be computed based on a function of the multi-attribute-based search preference representation scheme. Through this rating mechanism, each Web page may have its own value representing the relevance level from the user's viewpoint. To perform these series of evaluation processes, the present invention defines each evaluation component as a formal quantifiable measure and also devises the methods to compute relevance value in terms of each component. In addition, the present invention develops a synthesizing mechanism of relevance values from the components into a single unified relevance value, which becomes an ultimate criterion in providing the relevance information to user.

The validation issue of the WSTT-based query representation with multi-attribute-based search preference representation and the performance of the rating mechanism is not the main focus. Nevertheless, overall retrieval performance is summarized in FIG. 14. The evaluation approach measured the hit ratio, which is the percentage of the relevant page-hits to the 20 highest ranked pages returned from the search engines. Three different experiments were performed for validation. FIG. 14 shows the average hit ratio from those experiments and compares the evaluation approach with the performance of the commercial meta-search engine Copernic, as well as four major search engines.

As shown in FIG. 14, the retrieval approach, WebSifter, outperforms other approaches with significant differences. One interesting fact shown in the table is that the leading meta-search engine Copernic shows relatively poorer performance than other search engines. This seems to be the case because most of the relevant page hits have low-rankings from the search engines, and meta-search engines, such as Copernic, tend to consider those highly-ranked page hits from other search engines in determining its overall page ranking.

Concerning the time complexity of our retrieval approach, the query processing time increases exponentially with the size of the WSTT, especially the number of nodes and the number of concepts in each node. By assuming the WSTT as a full binary tree and N nodes having fixed number C of concepts, the time complexity increases proportional to $((N+1)/2) \cdot C^{log_2(N+1)}$, where $(N+1)/2$ is the number of paths and $C^{log_2(N+1)}$ is the number of combinations of the concepts per each path. Consequently, the time complexity in this particular case follows $O(N \cdot C^{log_2(N+1)})$, meaning that the processing time increases less dramatically than the pure exponential case which is $O(C^N)$. Thus, there is a reasonable trade-off between the additional query processing time complexity and the increased search precision provided by WebSifter. However, it takes only 30 seconds to 1 minute on average to obtain the results for the WSTT shown in FIG. 3. Generally, the average user will not likely create WSTTs that are more complex than that depicted in FIG. 3.

The performance results indicate that the present invention's representation scheme for a user's search queries and preferences provides a better alternative for user profile representation for personalization than other methods such as the vector space model. But a user profile representation must be adaptable in a systematic way to reflect a user's behavior and to incorporate user feedback. A formal user profile representation that may be adapted systematically by means of a learning mechanism will now be discussed.

Although the above discusses how to represent a user's search query and preferences, as well as how to rate the resulting page hits, these procedures are not sufficient in several respects. First, even though a user may represent his preferences and search queries correctly, his search intent and preferences may change over time and this means the initial information about the user becomes stale. Second, as users become equipped with more sophisticated tools, there is the chance that users will misuse or not understand how to use such tools. Therefore, the present invention offers a method that not only captures a user's search intent and preferences but also incorporates the acquired information into the profile's representation, on a continuous basis. The present invention accomplishes this by defining a user profile in a formal way and devising a feedback and learning mechanism.

In this semantic taxonomy-based meta-search agent approach, the present invention has a search intent representation comprised of terms and associated weights organized in a hierarchical structure. In addition, there are several types of search preferences such as component preference, search engine preference and syntactic rule preference. This relatively more sophisticated representation scheme for a user's search intent and preferences allows users to present requirements more precisely than previous research, which considers only words or terms and their relationships in documents.

These two observations imply that if such a representation approach could be used as a basis of user profile representation and learning, it would capture more accurately changes in a user's search intent and preferences thereby improving retrieval performance. The following summarizes the available information for the construction of a user profile:

Weights on the preference components, $cw^N(com)$: represent how important a user thinks each search preference component com is in his search.

Weights on the term nodes in the WSTT, $tw^N(n)$: represent the importance a user places on each concept node n in his search.

Weights on the search engines, $sw(s)$: represent the importance a user attributes to each search engine s in his search.

Weights on the syntactic Web page classification rules, $rsc(r)$: represent how much a user prefers a certain syntactic matching rule r in his search.

Weights on the parameters in the semantic and categorical match component relevancy computation, $\theta$ and $\alpha$: $\theta$ denotes a rate a user wants to consider the irrelevancy measure in his semantic rating and $\alpha$ denotes how much a user prefers the co-occurrence level to the order consistency level in the categorical match rating.

However, this listing of the relevant information vectors and the parameters itself is not enough to represent the user profile in our approach, because that list of vectors and parameters is organized to eventually produce a relevancy measure for a document. The information about how those vectors and parameters are organized is also a part of the user profile. In this sense, the present invention's approach is distinguished from an approach such as the Rocchio algorithm, which uses a simple word (or word frequency) vector as a user profile. Rather, the present invention's approach is closer to the approaches that use a structural computation model such as the neural network and the belief network. However, those two latter approaches are still based on the vector space model and incorporate only terms and their relationships into the structural organization of the user profile model, while the present invention's approach incorporates not only terms but also additional factors, such as the hierarchical structure of the terms and various preference components, into a more comprehensible structural user profile model.

Therefore, the present invention defines a user profile as the list of profile vectors and parameters mentioned above together with their structural organization of the terms showing how they affect each other in deciding the relevancy of a document to the user profile. The present invention adopts a connectionist model and local representation method to represent the user profile. Local representation here means that each node in the model designates a symbolic concept. This meaning differs from simply adopting a feed-forward neural network that assumes a black box, which implies that users do not know the meanings inside the network. In this case, however, the model is a white box, to facilitate explicit understanding of nearly every node and every weight in the model. This representation allows one to learn each parameter used in the WSTT-based information search framework and eventually to leverage all features from the semantic taxonomy-based meta-search engine approach.

Figure 6:
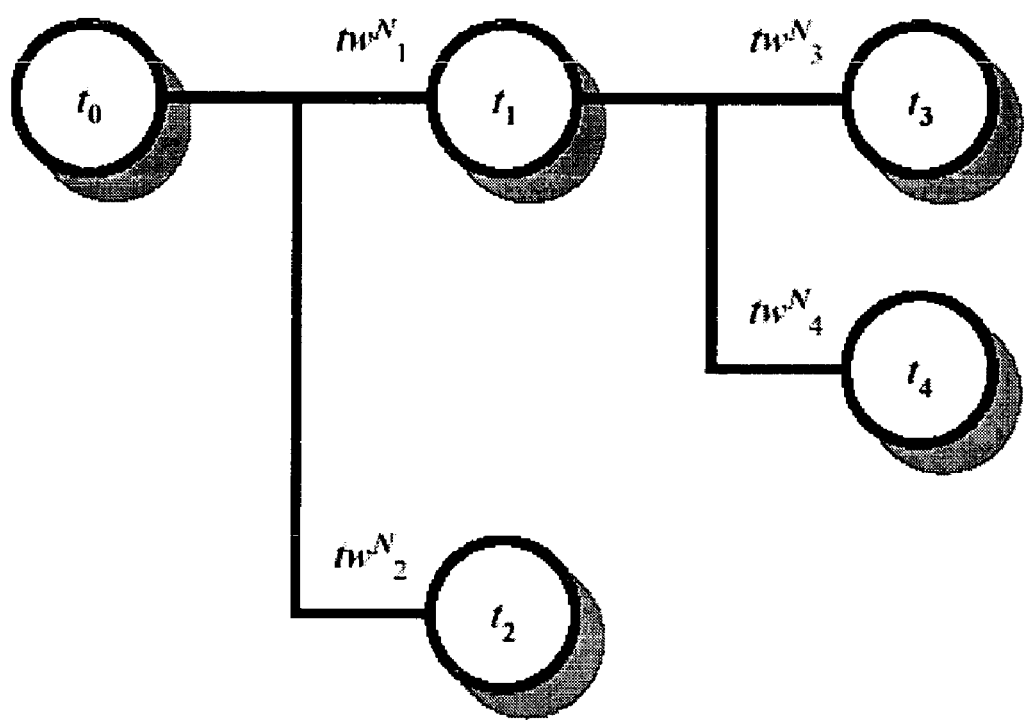
FIG. 6 is a block diagram showing an example structure of WSTT.

Since the present invention's user profile representation is dependent on the WSTT, assume an example WSTT shown in FIG. 6, where there are five terms $t_j$s and their associated normalized weights $tw^N_i$s organized hierarchically. Then the resulting user profile representation may be established as shown in FIG. 7.

Figure 7:
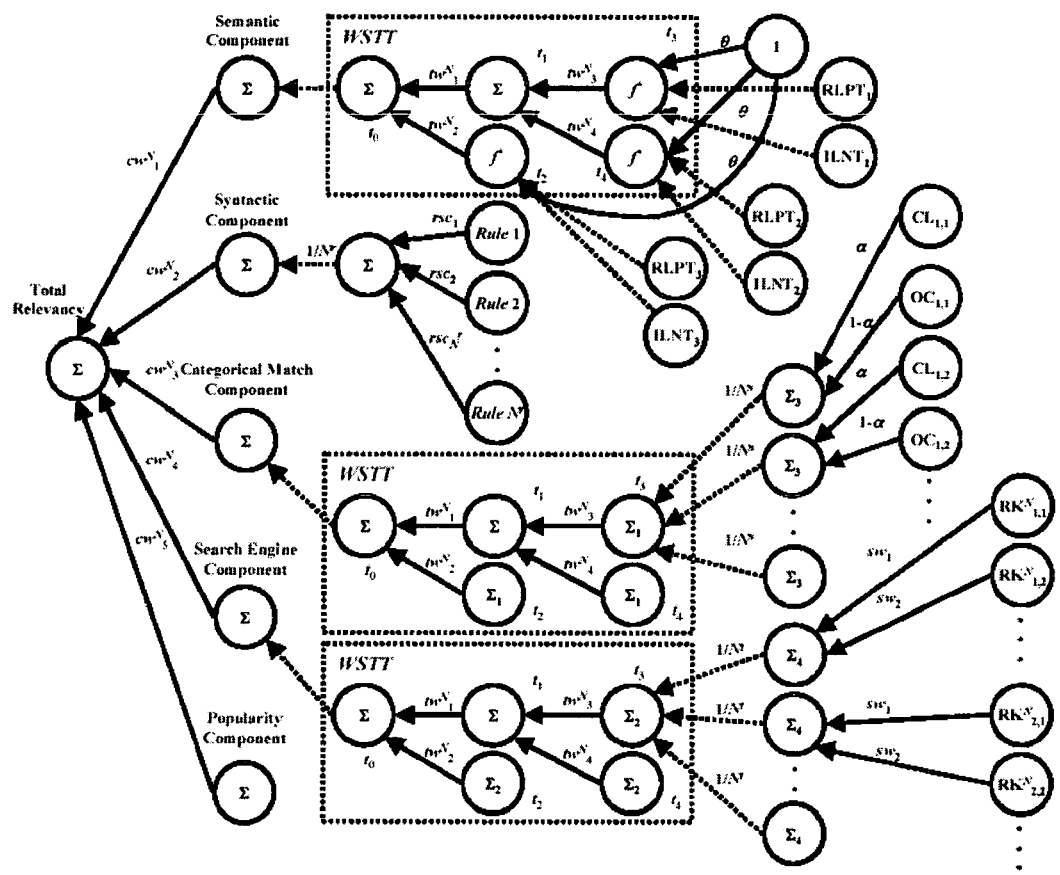
FIG. 7 is a diagram showing a connectionist model-based representation of a user profile.

FIG. 7 depicts the components of the user profile that are used to compute the total relevancy of a document, within the connectionist model. In addition, the overall diagram shows how these user profile components affect each other. In this representation of a user profile, a dotted line stands for a fixed connection between nodes while the solid line stands for an adjustable connection. The arcs with no associated weight symbol means its weight is 1.

The first layer in FIG. 7 starting from the left stands for the component relevance value composition mechanism discussed earlier and each node in this layer denotes a corresponding preference component. To the right side of this first layer, each sub-network represents the detailed mechanism used to obtain the corresponding component relevancy from the top to the bottom.

Furthermore, $N^T$, $N^S$, and $N^t$ denote the number of syntactic rules, the number of search engines, and the number of the term combinations, respectively. The symbols, $RLPT_i$ and $ILNT_i$ stand for "relevancy level of positive terms from the i-th path in the WSTT" and "irrelevancy level of negative terms from the i-th path in the WSTT", respectively. Rule i indicates the relevancy level measured by the i-th syntactic rule. $CL_{i,j}$ and $OC_{i,j}$ also mean the co-occurrence level and the order consistency level between the path i and the category information provided by the search engine j, respectively. Finally, $RK^N_{i,j}$ stands for a normalized rank information for the term combination i from the search engine j. The symbols $\Sigma$, $\Sigma_1$, $\Sigma_2$, $\Sigma_3$, $\Sigma_4$, and f* are related to the computational issues. Some of the sub-networks are omitted because of space limitations. The light-shaded nodes denoted with one of $\Sigma_1$, $\Sigma_2$, $\Sigma_3$, and $\Sigma_4$, have the same sub-network as the node denoting the same symbol; the present invention may only depict the sub-network fully for one of such nodes that have the same symbol.

When applying this scheme of user profile representation to a web document to measure relevancy, the set of values in the leaf nodes obtained for the document forms a document representation. So, to evaluate a web document based on the user profile, those values are generally first computed for each document and then applied to the user profile to obtain total relevancy.

Generally, user feedback may be obtained in two ways, explicitly and implicitly. Explicitly, a user has to describe his perceived relevancy for the resulting page hits. Implicitly, a user does not need to provide any formal responses to the resulting page hits. Instead, some automatic monitoring of the user's navigation behavior needs to be performed. Feedback in the explicit case is usually more accurate than the implicit case.

The present invention adopts the explicit feedback approach, but the definition of the error may be easily extended to the implicit feedback approach. A user is asked for his judgment on the relevancy of each resulting page hit. The user chooses from "relevant" and "irrelevant." The user may also use the default value of "don't know," to indicate no particular preference.

The relevancy error computing rule denotes the relevancy error occurring in a page pg by $E_{pg}$ and defines it formally as follows:

$$E_{pg} = \frac{1}{2}(rv^U(pg) - rv(pg))^2 \quad (1)$$

where $rv^U(pg)$ is user's rated relevancy on the page pg and rv(pg) is relevancy value rated by our approach.

As a way to quantify the user's answer, assign 1 to $rv^U(pg)$ when the page is relevant, and 0, otherwise. For example, if the relevancy expectation on a page pg is 0.7 and the user's reply is 1, then $E_{pg}$ becomes $\frac{1}{2} \times 0.3^2 = 0.045$.

Based on (1), we may define total relevancy error, TE, for all pages, which has user's ratings, as follows:

$$TE = \sum_{pg} E_{pg} \quad (2)$$

The objective function for the learning process is to minimize the total relevancy error.

Before deriving a learning mechanism for the user profile representation, one may note that the model shown in FIG. 7 also addresses how the overall computation of the relevancy is performed. In each node, if it is not the leaf node, the relevancy values of the child nodes are aggregated and the symbols appeared in the node represents the aggregation method applied to it. If it is a leaf node, the relevancy value of the node is the input to the model. Each sigma symbol, $\Sigma$, indicates that the relevancy in the node is computed by the following formula (3) regardless of whether it has a subscript or not in the figure.

A general propagation rule is:

$$O_{pg,j} = \sum_i w_{ji} o_{pg,i} \quad (3)$$

where $o_{pg,j}$ and $o_{pg,i}$ are the output values on the node, j and i for the case of a Web page pg, respectively and $w_{ji}$ is a weight from the node i to the node j.

In addition, the symbol f* means the relevancy in the node may be computed by the following formula according to the theta propagation rule.

$$O_{pg,j} = (RLPT_i) \cdot (1-\theta)^{ILNT_i} \quad (4)$$

Where $\theta$ is a given [0, 1] scale degradation rate and $RLPT_i$ and $ILNT_i$ are the relevancy level of the connected incoming nodes to the node j.

Therefore, the user profile representation may be regarded as a feed-forward neural network model from the computational model point of view and so, one may consider the neural network learning scheme as a learning mechanism in our profile learning task. But, there are several problems that prevent one from simply applying one of the well-known neural network learning algorithms to this case.

The first problem is that the user profile representation model depicted in FIG. 7 differs from the typical feed-forward neural network model in that some of the weights are overlapped and those overlapped weights are required to always have the same value. As shown in FIG. 7, the parameters θ, α, and $sw_i$ are overlapped in multiple places and this means that when each of the weights in the model are adjusted to understand the user's feedback, the weights that share the same parameter must be controlled to have the same value. A similar restriction also happens in the case of WSTT. The same WSTT depicted in FIG. 6 is also used three times in different places of the user profile representation model as shown in FIG. 7. Therefore, the weights from different positions but sharing the same parameter, $tw^N_i$, must always have the same value because $tw^N_i$ may not have multiple values at any given time.

To define this problem more precisely, some definitions are necessary. For a given parameter p, if there are multiple weights that share this parameter as their value, this set of weights is called "parameter sharing weight set" of the parameter p and denoted with PSWS(p). In addition, a weight $w_{ji}$ shares by $PS(w_{ji})$. For example, there are three such weights in PSWS(θ) as shown in the right-upper side of FIG. 7. For all such $w_{ji} \in PSWS(p)$ for a parameter p, those weights should be always equal to each other. Since the typical neural network learning algorithms may not address this kind of restriction, a way must be devised a way to resolve such a problem.

The second problem is that several sets of weights in the user profile representation model must obey the rule that the sum of the weights in the set should be 1 for the purpose of normalization. At first, the weight sets, $\{w_{ji}|PS(w_{ji})=cw^N_k$ and k=1, 2, . . . , 5}, $\{w_{ji}|PS(w_{ji})=sw_k$ and k=1, 2, . . . , $N^S$} for each node j denoted by $\Sigma_4$, and $\{w_{ji}|PS(w_{ji})=\alpha$ or $1-\alpha\}$ for each node j denoted by $\Sigma_3$ follow this rule. In addition, each set of weights on the nodes that have the same parent in the WSTT also follows this rule. All these weight sets that follow the rule are called "normalization weight sets" and the set of such sets is denoted by NWS. To address this problem, a normalization method is needed while learning is performed.

The third problem is all of the weights are bounded in a value range [0, 1] and the fourth and trivial problem is f is not a typical additive function but a multiplicative and exponential function, which means a new weight updating rule for this function, which is different from the conventional updating rule, needs to be derived.

To resolve the above four problems in applying the typical neural network learning algorithm to our user profile learning task, the present invention uses a user profile learning algorithm which embeds the generalized delta rule as a core heuristic. The following definitions and formulae apply.

At first, to apply the generalized delta computing rule, a delta in a node j for a feedback Web page pg, $\delta_{pg,j}$ is defined as follows:

$$\delta_{pg,j} = \begin{cases} rv^U(pg) - rv(pg) & \text{if } j \text{ is an output node} \\ \sum_k \delta_{pg,k} w_{kj} & \text{otherwise} \end{cases} \quad (5)$$

where k is a node in the upper layer to the layer to which the node j belongs.

Using this delta, a weight-updating rule may be derived as follows:

$$w_{ji}^{updated} = w_{ji}^{old} + \eta \cdot \delta_{pg,j} \cdot o_{pg,i} \quad (6)$$

where η is a learning rate for the weight.

However, as mentioned before, these two rules, (5) and (6) are not enough to address all our learning requirements. In addition, a delta for theta computing formula to address the fourth problem may be derived as follows:

$$\delta_{pg,j}^\theta = \left(\sum_k \delta_{pg,k} w_{kj}\right) \cdot (-RLPT_i) \cdot ILNT_i \cdot (1-\theta)^{(ILNT_i - 1)} \quad (7)$$

where the node j is a f* type node and $RLPT_i$ and $ILNT_i$ are the relevancy level of the connected incoming nodes to the node j.

Then, use (6) for updating the parameter θ in the f* function but since the value of the incoming node of this θ connection is always fixed to 1, its theta updating rule may be simplified as follows:

$$\theta_j^{updated} = \theta_j^{old} + \eta \cdot \delta_{pg,j}^\theta \quad (8)$$

where the $\theta_j$ is a corresponding θ in a f* type node j.

In addition to these definitions and formulas, one way to address the first problem mentioned above is to define a set of weights sharing the same parameter as "parameter sharing weight set" and denote it by PSWS(p) for a given parameter p. Then, devise a weight synchronization procedure, which assures the weights in a PSWS to always have the same value as follows:

$$w_{ji}^{synchronized} = \sum_{w_{si} \in PSWS} w_{st}^{unsynchronized} / n(PSWS(p_k)) \quad (9)$$

where the $w_{st} \in PSWS(p_k), p_k$ is a given k-th parameter, and $n(PSWS(p_k))$ is the number of elements in $PSWS(p_k)$.

Also, a weight normalization procedure may be devised to address the normalization constraints mentioned in the second problem. The resulting weight renormalization rule is formalized as follows:

$$w_{ji}^{renormalized} = w_{ji}^{before-normalized} / \sum_{w_{jk} \in NWS_i} w_{jk}^{before-normalized} \quad (10)$$

where the $w_{ji} \in NWS_i$ and $NWS_i \in NWS$.

Now, a user profile learning algorithm may be proposed based on the user profile representation as shown in FIG. 7 using the definitions and the formulas derived thus far, while resolving all four mentioned problems. The algorithm is described in FIG. 8 using pseudo code and it is organized to show the procedure to perform the learning task. Further, when the algorithm was implemented, computational efficiency considerations may be taken into account.

Figure 9:
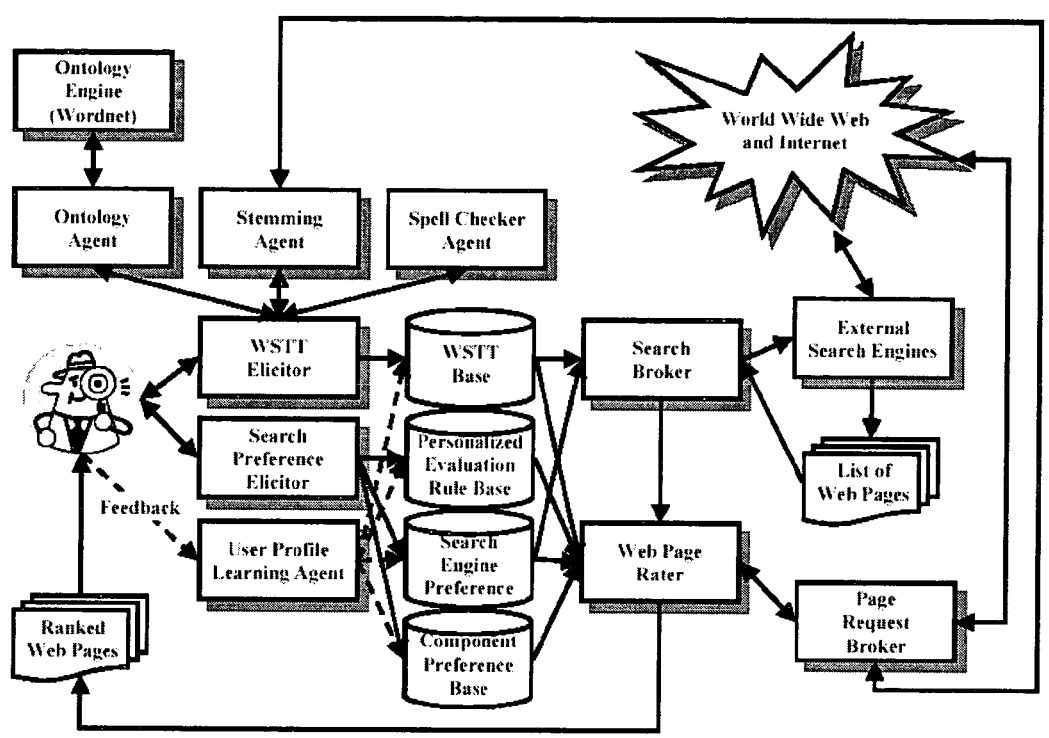
FIG. 9 is a block diagram of a system architecture as per an embodiment of the present invention.

FIG. 9 shows the overall architecture of WebSifter II and its components. Major information flows are also depicted. WebSifter II consists of nine subsystems and four major information stores.

The WSTT elicitor supports the entire process of specifying a WSTT in a GUI environment. A user may express his search intent as a WSTT through interactions with the WSTT elicitor. This includes building a taxonomy tree, assigning weights to each node, and choosing a concept from an available list of WordNet concepts. To achieve this goal, the WSTT elicitor also cooperates with an Ontology agent, a Stemming agent, and a Spell Check agent. Once a user finishes building a WSTT, then the WSTT elicitor stores the WSTT information into the WSTT base in XML format.

The ontology agent is responsible for requesting available concepts of a given term via a Web version of WordNet (http://www.cogsci.princeton.edu/cgi-bin/webwn/) and also for interpreting the corresponding HTTP-based results. The agent receives requests for the concepts from WSTT elicitor and returns available concepts in an understandable form. Although WebSifter presently supports cooperation only with WordNet, its design may be easily extended to cooperate with other ontology servers such as CYC and EDR.

The stemming agent is based on Porter's algorithm. It has two major roles: 1) to cooperate with the WSTT elicitor in transforming the terms in a concept to stemmed terms, and 2) to transform the content of Web pages into the stemmed terms internally through cooperation with a page request broker. As a result, the terms in concepts and the terms in Web pages may be compared to each other via their stemmed versions.

The spell check agent monitors the user's text input to the WSTT elicitor and checks and suggests correct words to the user in real time.

The search preference elicitor, via a GUI, supports the process of capturing the user's search preferences. A user may express his search preference by assigning their preference weights to each of the preference components and also to their favorite search engines. Moreover, it allows the user to modify the default values assigned to each syntactic URL class such as Direct Hit, Directory Hit and Page Hit. Whenever the user modifies them, it updates the related information stored in the Personalized Evaluation Rule Base, the Search Engine Preference Base and the Component Preference Base.

The search broker performs the processes as specified previously. It first interprets the XML-based WSTT and then generates all corresponding query statements. Using this set of queries, it requests information from a set of popular search engines simultaneously. Finally, it interprets the results returned from the search engines and then stores parsed information in a temporary data store. When it finishes its work, it activates the Web page rater to begin the rating process.

The page request broker is responsible for requesting the content of a specific URL and it cooperates with both the stemming agent and the Web page rater.

The Web page rater supports the entire Web page evaluation process and also is responsible for displaying the results to users. This subsystem is the most complex and computationally intensive module of WebSifter II, and it uses all four major information stores and also communicates with the search broker and the page request broker.

The user profile-learning agent first allows the user to provide feedback on the relevancy of the proposed Web page hits via an interactive user interface. Then, when the user invokes learning or when the user closes the system, the learning process starts and it updates various user preference parameters to reflect the user's feedback information. The user may instantly refresh the search results based on the updated profile or may use it in another query later. During the update, the agent modifies all four information stores in WebSifter II.

The present invention incorporates the framework of our semantic taxonomy-based meta-search agent approach and its user profile learning mechanism into a working prototype written in Java, except for one component, the spell check agent. The inventors envision incorporating a commercial spell check agent into the system.

Figure 10:
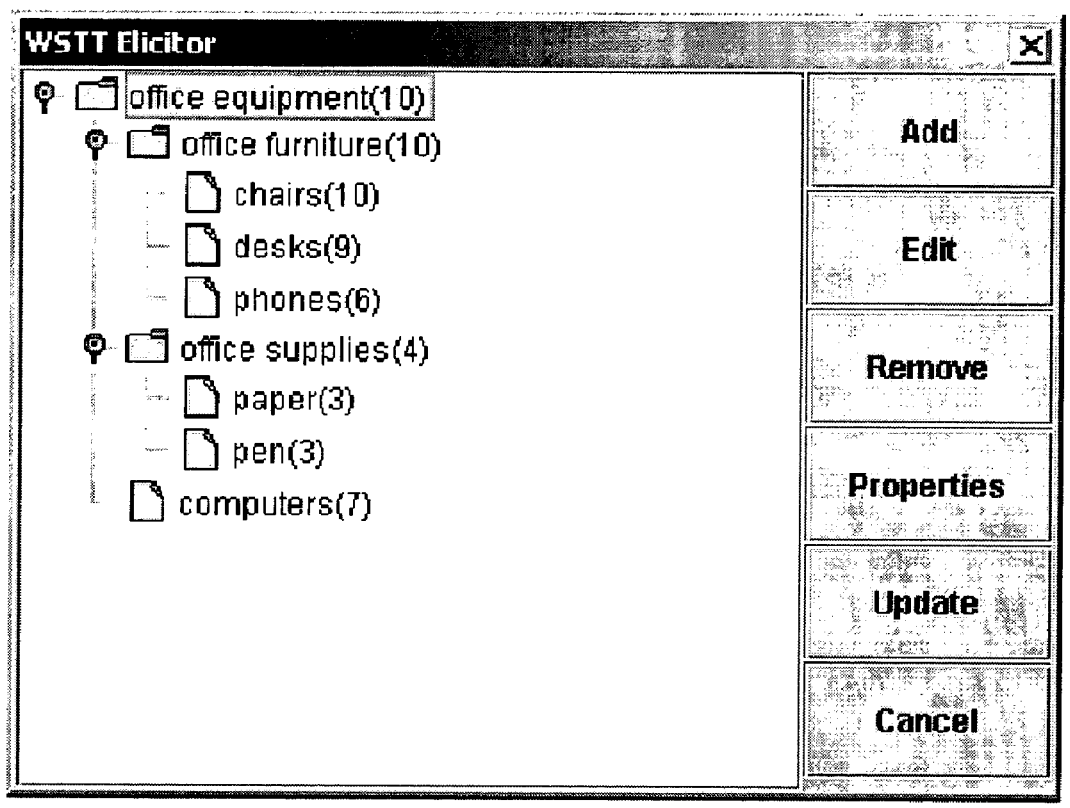
FIG. 10 shows an illustrative screen of a WSTT elicitor as per an embodiment of the present invention.
Figure 11:
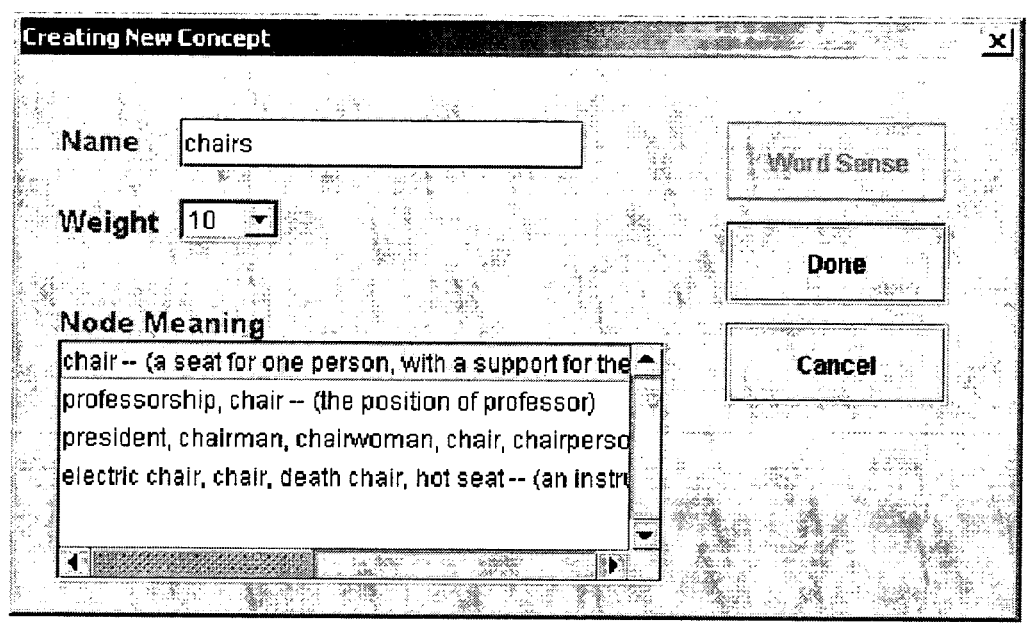
FIG. 11 shows an illustrative screen of a concept selection as per an embodiment of the present invention.

FIG. 10 shows an illustrative screen where the user builds a WSTT using the WSTT elicitor. FIG. 11 shows another screen of the WSTT elicitor supporting the selection of an intended concept from available concepts for a given term, obtained through cooperation with the ontology agent and WordNet.

Figure 12:
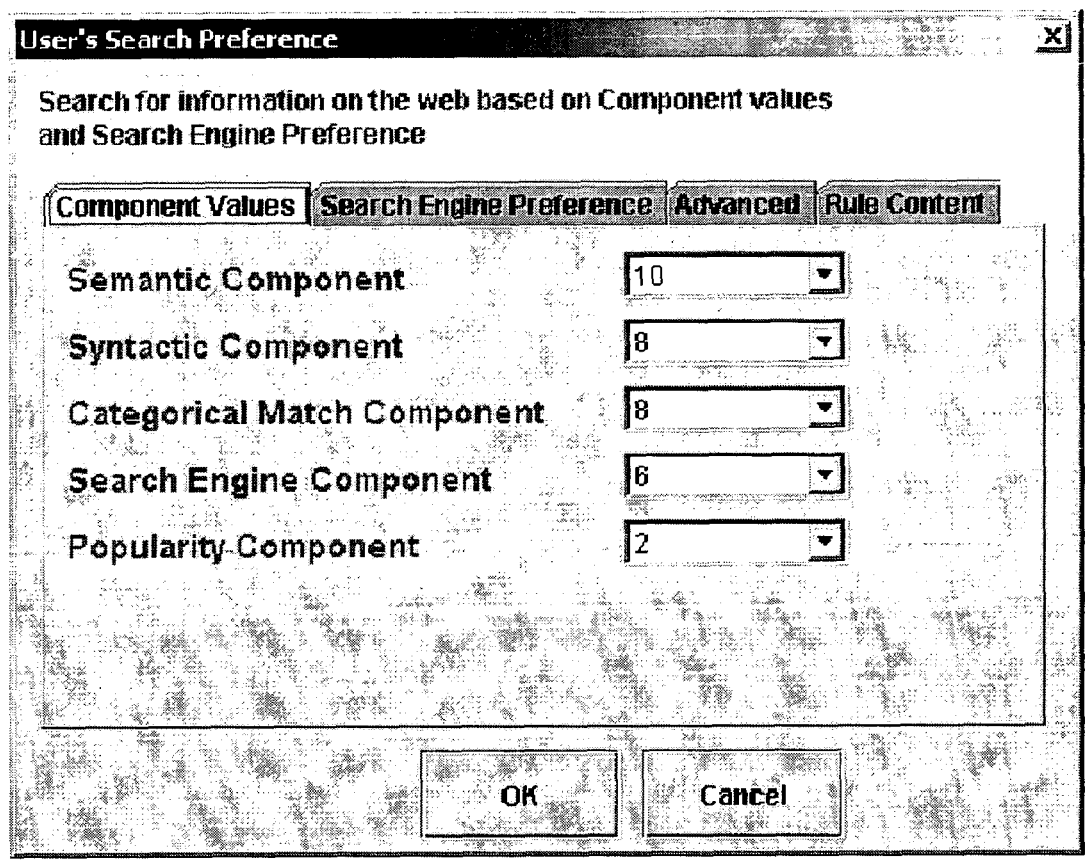
FIG. 12 shows a tab window of a search preference elicitor as per an embodiment of the present invention.

FIG. 12 shows a sample screen for a user to specify his search preference using our search preference elicitor. The four tab windows in FIG. 12 are for adjusting the user's preference for the relevance components, search engines, various parameters in our mechanism, and classification rules for Web pages, respectively. However, only the tab window for preference components is shown in FIG. 12.

Figure 13:
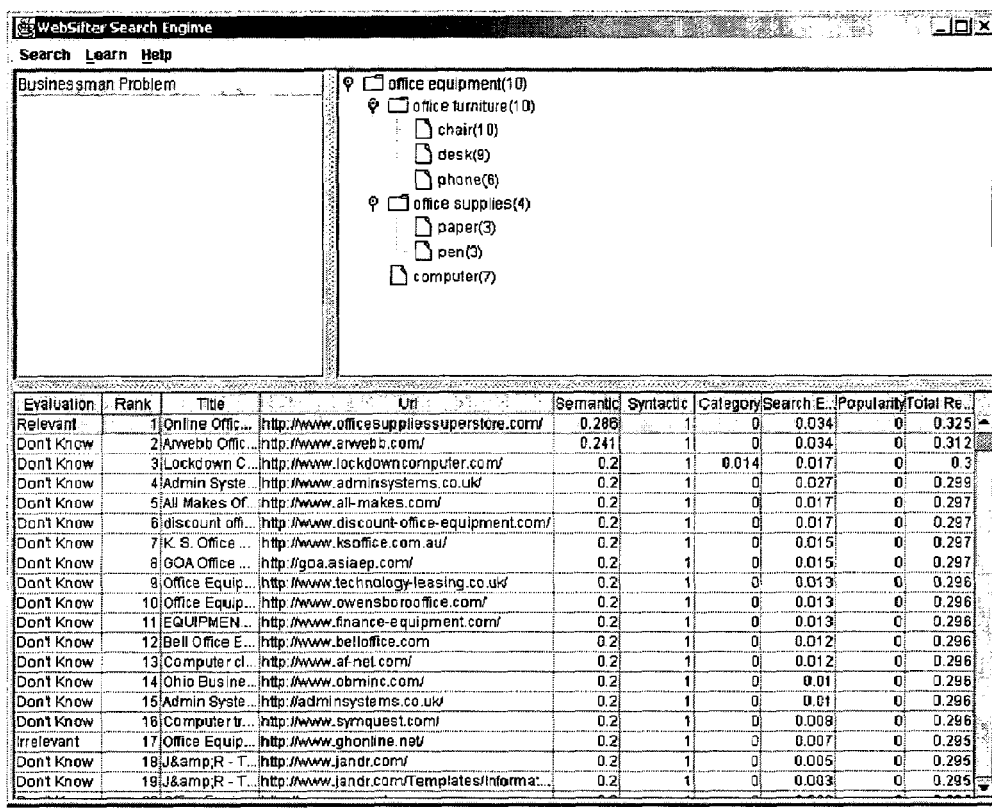
FIG. 13 shows an illustrative screen for the result from a web page rater and feedback interface as per an embodiment of the present invention.

Finally FIG. 13 shows a query result screen for WebSifter II. Note that the left-most column in the table for the resulting page hits, is reserved for obtaining user relevancy feedback. Whenever a user views a URL using the browser, which is invoked by clicking the URL on the screen, he may provide his rating feedback in the corresponding row on the feedback column by choosing one of the values, relevant or irrelevant using a dropdown list box. The user may select the default value "don't know" if he does not want to rate the page or feels unsure of his rating. Once the user finishes his rating, then he may invoke the learning process by selecting the learn menu from the menu bar. If he does not want to activate the learning mechanism explicitly, the system will invoke the learning process automatically when the user closes the system. In the case of activating the learning explicitly, the search results are instantly refreshed according to the new updated user profile and system parameters.

To exemplify how the learning actually works, assume the cases appearing in FIG. 13 and demonstrate the required computations for the weight adjustments at the first layer in FIG. 6. If a user rated only the first ranked page in FIG. 13, 'www.officesuppliessuperstore.com', as a relevant page and he activated the learning mechanism, then the delta value of the output node in FIG. 6 may be computed as 1−0.325=0.675 according to (4) since the suggested relevancy of that page by WebSifter, was 0.325. And because our five preference component relevancy values are 0.286, 1.0, 0.0, 0.034, and 0.0, respectively as shown in FIG. 13, their weight adjustment levels become as follows, if we assume □ is 0.5:

$$\Delta cw_{semantic}^N = 0.5 \times 0.675 \times 0.286 = 0.097$$

$$\Delta cw_{syntactic}^N = 0.5 \times 0.675 \times 1.0 = 0.338$$

$$\Delta cw_{categorical\ match}^N = 0.5 \times 0.675 \times 0.0 = 0.0$$

$\Delta cw_{search\ engine}^{N} = 0.5 \times 0.675 \times 0.034 = 0.011$ $\Delta cw_{popularity}^{N} = 0.5 \times 0.675 \times 0.0 = 0.0$ One may compute the updated weights for them by adding the above adjustment levels to the old weights, where they are 0.294, 0.235, 0.235, 0.176, and 0.059, respectively from the top to the bottom in the above case. Then, the resulting new updated weights on the above five components become 0.294+0.097=0.391, 0.235+0.338=0.573, 0.235+0.0=0.235, 0.176+0.011=0.187, and 0.059+0.0=0.059, respectively. But these new updated weights violate the constraint that requires their sum to be 1. Thus, additionally, a re-normalization process to these weights according to (10) needs to be applied. After finishing this process, the weights for five components become 0.271, 0.397, 0.163, 0.129, and 0.040, respectively. As a result, the weight only for the syntactic component increases but all other weights for the remaining components decrease in terms of their relative importance levels in the user preferences. This process will continue until at least one of the stopping conditions is satisfied, such as the maximum number of epochs.

To evaluate the performance of the user's search profile learning mechanism demonstrated here, the inventors performed several empirical experiments under the respective scenarios. In the experiments, the inventors measured the performance with the level of enhancement of hit ratio, that is, the ratio obtained by dividing the number of relevant page by the total number of page hits.

The inventors assume the following scenario applied to the experiment. Using WebSifter II, a user requests a simple search query "chair" and gets the retrieved page hits shown in FIG. 15. Initial retrieval performance is not the main concern here and the initial retrieval performance of Web-Sifter II has been reported. The semantic taxonomy-based approach is competitive with other semantic approaches.

FIG. 15 shows the top 20 page hits retrieved for the search query "chair" by WebSifter and also shows its evaluation of the relevancy of each page hit in the last column. "Y" means the corresponding page hit is relevant to the user while "N" means it is irrelevant. Here, assume the user wants to retrieve the page hits only related to a chair people sit on. In this scenario, the user gives his feedback on only top five page hits as shown in the column labelled "Feedback" in the table.

Based on this scenario, the inventors performed the user's search profile learning and obtained the new retrieved page hit results shown in FIG. 16. These are based on the newly obtained weight and parameter results of learning.

List of the page hits in FIG. 16 is much different from FIG. 15. There are many more relevant page hits compared to the initial page hit results. One interesting thing is that the page hits containing the term "seat" were evaluated as "irrelevant" by the user. The learning process effectively caught this point based on the fact that most of the page hits containing the term "seat" in FIG. 15 are dramatically downgraded or dropped from the top 20 lists in FIG. 16.

In terms of page-hit ratio, the learning achieves a 25% performance improvement. The hit ratio was 30% in FIG. 15 (before learning) and now it is 55% in FIG. 16 (after learning). In addition to this experiment with the search term "chair", four more search terms were used to evaluate the profile learning performance. These additional experiments also performed comparably well as in the "chair case", and FIG. 17 shows the page-hit ratios results from the experiment including the "chair" case. On the average, the profile learning approach achieves a 29% performance enhancement based on five user feedbacks on the top five initially retrieved page hits. This is a very impressive improvement with user feedback on only five hits. Other ongoing experiments performed also show a similar level of supportive results to our user's search profile approach. Even though the experiments in FIG. 17 are still very limited, these initial results seem to be enough to indicate that the learning approach improves retrieval performance considerably.

The semantic taxonomy-based meta-search agent approach has been proposed to achieve two important and complementary goals: 1) to allow users more expressive power in formulating their Web searches, and 2) to improve the relevancy of search results based on the user's real intent. These goals have been achieved in the WebSifter prototype system. However, one weakness to our approach is that it does not support user profile learning for personalization, even though it may represent a user's search intent and preference well. To overcome this shortcoming and to achieve better personalization, the present invention proposes the addition of a connectionist model-based user profile representation and learning mechanism to the semantic taxonomy-based meta-search agent approach.

The learning mechanism proposed in this paper enhances the functionality of WebSifter by allowing the automatic and dynamic update of the user's profile to adjust to the user preferences based on user feedback regarding the relevance of pages returned from a Web search. The connectionist model-based approach proposed has been shown to be effective in recognizing changes in user preferences and adapting those preferences to improve search results.

In summary, the present invention proposes a user's query intent and search preference profile representation scheme in conjunction with the search-intention representation scheme, the Weighted Semantic-Taxonomy Tree and the search preference representation scheme based on the various preference components. It allows representing a user's profile of search intent and preferences in a more sophisticated manner than previous approaches based on the vector space model.

Second, the present invention presents a connectionist model-based user profile representation and learning mechanism to learn user search intent and preferences in the Web search based on the proposed user profile representation scheme. To achieve this goal, the present invention first represents the entire rating mechanism as a connectionist model adopting a local representation method and then, devise a profile-learning algorithm based on the generalized delta rule.

Third, the present invention implements the inventors' designed, user profile-learning agent as a component of the meta-search agent system called WebSifter II, which cooperates with WordNet for concept retrieval, and most well known search engines for Web page retrieval. For the empirical validation of our user profile learning approach, the inventors performed real world experiments of our system and empirically proved validity of our approach.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A computer implemented search method comprising:
   a) accepting search intent information from a user the creation of a semantic taxonomy tree having at least one term representative of said search intent information;
   b) augmenting said at least one term with at least one associated concept derived from at least one of said at least one term using existing terminological data;
   c) associating a weight with at least one of said at least one term;
   d) obtaining user preference intent for at least one relevance value;
   e) determining at least one root term for said at least one term;
   f) transforming said semantic taxonomy tree to at least one Boolean search query;
   g) submitting at least one of said at least one Boolean search query to at least one searcher;
   h) receiving at least one search result from said at least one searcher;
   i) interpreting said at least one search result;
   j) requesting at least one page specified by said at least one search result;
   k) receiving at least one retrieved page;
   l) generating ranked results by ranking said at least one retrieved page by applying at least one of said at least one relevance value and said search intent information to said at least one retrieved page;
   o) presenting said ranked results to said user;
   n) presenting said semantic taxonomy tree to said user;
   o) accepting user feedback from said user; said user feedback indicating how well said search results addressed said search intent; and
   p) using said user feedback to update said user preference intent for said at least one relevance value.

2. A search method according to claim 1, wherein each term has an associated weighting factor.

3. A search method according to claim 1, wherein at least one of said at least one associated concept includes at least one synonymous concept.

4. A search method according to claim 1, wherein at least one of said at least one associated concept includes at least one antonymous concept.

5. A search method according to claim 1, wherein said at least one relevance value includes at least one of the following:
   a) a composite component;
   b) a semantic component;
   c) a categorical match component;
   d) a search engine component;
   e) an authority/hub component; and
   f) a popularity component.

6. A search method according to claim 1, wherein said at least one relevance value includes all of the following:
   a) a composite component;
   b) a semantic component;
   c) a categorical match component;
   d) a search engine component; and
   e) a popularity component.

7. A search method according to claim 1, wherein said step of presenting said semantic taxonomy tree to said user further includes the step of expanding or narrowing the presentation by said user clicking on nodes of said taxonomy tree.

8. A search method according to claim 1, wherein said at least one Boolean search query is formatted specifically for a preselected searcher.

9. A search method according to claim 1, wherein said page includes at least one of the following:
   a) a web page;
   b) a document;
   c) an image;
   d) an XML document;
   e) a semantic web document; and
   f) data.

10. A search method according to claim 1, wherein said step of using said user feedback to update said user preference intent for said at least one relevance value uses a neural network methodology with back propagation.

11. A machine readable medium having stored thereon instructions that, when executed by a computer:
    a) accepts search intent information from a user through the creation of a;
    semantic taxonomy tree having at least one term representative of said search intent information;
    b) augments said at least one term with at least one associated concept derived from said search intent information using existing terminological data;
    c) associates a weight with at least one of said at least one term;
    d) obtains user preference intent for at least one relevance value;
    e) determines at least one root term for said at least one term;
    f) transforms said semantic taxonomy tree to at least one Boolean search query;
    g) submits at least one of said at least one Boolean search query to at least one searcher;
    h) receives at least one search result from said at least one searcher;
    i) interprets said at least one search result;
    j) requests at least one page specified by said at least one search result;
    k) receives at least one retrieved page;
    l) generates ranked results by ranking said at least one retrieved page by applying at least one of said at least one relevance value and said search intent information to said at least one retrieved page;
    m) presents said ranked results to said user;
    n) presents said semantic taxonomy tree to said user;
    o) accepts user feedback from said user; said user feedback indicating how well said search results addressed said search intent; and
    p) uses said user feedback to update said user preference intent for said at least one relevance value.

12. A machine readable medium according to claim 11, wherein each term has an associated weighting factor.

13. A machine readable medium according to claim 11, wherein at least one of said at least one associated concept includes at least one synonymous concept.

14. A machine readable medium according to claim 11, wherein at least one of said at least one associated concept includes at least one antonymous concept.

15. A machine readable medium according to claim 11, wherein said at least one relevance value includes at least one of the following:
    a) a composite component;
    b) a semantic component;

c) a categorical match component;
d) a search engine component;
e) an authority/hub component; and
f) a popularity component.

16. A machine readable medium according to claim 11, wherein said at least one relevance value includes all of the following:
   a) a composite component;
   b) a semantic component;
   c) a categorical match component;
   d) a search engine component; and
   e) a popularity component.

17. A machine readable medium according to claim 11, wherein said computer expands or narrows the presentation when said user clicks on nodes of said taxonomy tree.

18. A machine readable medium according to claim 11, wherein said at least one Boolean search query is formatted specifically for a preselected searcher.

19. A machine readable medium according to claim 11, wherein said page includes at least one of the following:
   a) a web page;
   b) a document;
   c) an image;
   d) an XML document;
   e) a semantic web document; and
   f) data.

20. A machine readable medium according to claim 11, wherein said computer further uses a neural network methodology with back propagation when said computer uses said user feedback to update said user preference intent for said at least one relevance value.

21. A computer implemented search agent comprising:
   a) a weighted semantic taxonomy tree elicitor capable of accepting search intent information from a user having a search intent through the creation of;
   a weighted semantic taxonomy tree capable of storing at least one term representative of said search intent information;
   b) an ontology agent capable of deriving concepts from said at least one term using terminological data;
   c) a search preference elicitor capable of receiving user preference intent for at least one relevance value;
   d) at least one search preference elicitor database capable of storing said user preference intent;
   e) a stemming agent capable of determining a root term from said search preference elicitor database;
   f) a search broker including:
      i) a transformer capable of transforming said weighted semantic taxonomy tree to at least one boolean search query;
      ii) a search submitter capable of submitting at least one of said at least one boolean search query to at least one search engine; and
      iii) a search engine result receiver capable of receiving at least one search engine result from said boolean search query submission;
   g) a page request broker capable of retrieving at least one retrieved page specified by said search engine result;
      i) a web page rater capable of generating ranked results by ranking said at least one retrieved page by applying said relevance values and said search intent information to said at least one retrieved page; and
   h) a presentation manager capable of presenting said weighted semantic taxonomy tree and said ranked results to said user;
   i) a user profile learning agent capable of:
      i) accepting user feedback from said user; said user feedback indicating how well said search results addressed said search intent; and
      ii) using said user feedback to update at least one of said user preference intent in said at least one search preference elicitor database.

22. A search agent according to claim 21, further including a spell check agent.

23. A search agent according to claim 21, wherein each of said at least one term has an associated weighting factor.

24. A search agent according to claim 21, wherein said terminological data comes from an ontology engine.

25. A search agent according to claim 21, wherein said concepts include at least one synonymous concept.

26. A search agent according to claim 21, wherein said concepts includes at least one antonymous concept.

27. A search agent according to claim 21, wherein each of said at least one relevance value has an associated user-assigned weighting.

28. A search agent according to claim 21, wherein said at least one relevance value includes at least one of the following:
   a) a composite component;
   b) a semantic component;
   c) a categorical match component;
   d) a search engine component;
   e) an authority/hub component; and
   f) a popularity component.

29. A search agent according to claim 21, wherein said at least one relevance value includes all of the following:
   a) a composite component;
   b) a semantic component;
   c) a categorical match component;
   d) a search engine component; and
   e) a popularity component.

30. A search agent according to claim 21, wherein said weighted semantic taxonomy tree elicitor, said search preference elicitor, and said presentation manager are integrated.

31. A search agent according to claim 21, wherein said weighted semantic taxonomy tree uses XML.

32. A search agent according to claim 21, wherein said at least one search preference elicitor database includes at least one of the following:
   a) a personalized evaluation rule base;
   b) search engine preferences base; and
   c) a component preference base.

33. A search agent according to claim 21, wherein said stemming agent is capable of determining at least one said root term from said page request broker.

34. A search agent according to claim 21, wherein said presentation manager can expanded or narrow said presented weighted semantic taxonomy tree by clicking on nodes of said weighted semantic taxonomy tree.

35. A search agent according to claim 21, wherein said at least one boolean search query is formatted specifically for a preselected search engine.

36. A search agent according to claim 21, wherein said page request broker is capable of retrieving at least one retrieved page specified by said stemming agent.

37. A search agent according to claim 21, wherein said page includes at least one of the following:
 a) a web page;
 b) a document;
 c) an image;
 d) an XML document;
 e) a semantic web document; and
 f) data.

38. A search agent according to claim 21, wherein said user profile learning agent uses at least one neural network methodology with back propagation.

* * * * *